United States Patent [19]

Stephens et al.

[11] Patent Number: 5,709,407
[45] Date of Patent: Jan. 20, 1998

[54] ENERGY ABSORBING VEHICLE TRIM MOLDING

[75] Inventors: James E. Stephens, Ortoville; Messaoud Founas, Auburn Hills; Fred Daris, Clarkston; Sukhbir S. Bilkhu, Rochester Hills, all of Mich.

[73] Assignee: Chrysler Corporation, Auburn Hills, Mich.

[21] Appl. No.: 542,980

[22] Filed: Oct. 13, 1995

[51] Int. Cl.⁶ .................................................. B60R 21/04
[52] U.S. Cl. ........................................ 280/751; 296/189
[58] Field of Search .............................. 280/748, 751, 280/752; 296/153, 189

[56] References Cited

U.S. PATENT DOCUMENTS

| | | |
|---|---|---|
| 3,904,223 | 9/1975 | Wilfert et al. ........................ 280/751 |
| 3,989,275 | 11/1976 | Finch et al. . |
| 4,388,355 | 6/1983 | Ikemizu . |
| 4,466,646 | 8/1984 | Delmastro et al. . |
| 4,769,951 | 9/1988 | Kaaden . |
| 4,786,100 | 11/1988 | Kleemann et al. . |
| 4,869,543 | 9/1989 | Grimes . |
| 4,968,083 | 11/1990 | Tomforde . |
| 5,040,335 | 8/1991 | Grimes . |
| 5,141,279 | 8/1992 | Weller . |
| 5,163,730 | 11/1992 | Welch ................................ 280/751 |
| 5,370,417 | 12/1994 | Kelman et al. ...................... 280/751 |
| 5,433,478 | 7/1995 | Naruse ................................ 280/751 |
| 5,544,933 | 8/1996 | Shahab et al. ....................... 296/189 |
| 5,593,182 | 1/1997 | Frost ................................... 280/751 |
| 5,609,385 | 3/1997 | Daniel et al. ........................ 280/751 |

Primary Examiner—Paul N. Dickson
Attorney, Agent, or Firm—Thomas G. Pasternak

[57] ABSTRACT

A vehicle body interior trim molding for attachment to a pillar curved metal shell structure for absorbing energy to protect occupants of the passenger compartment in case of an accident. The molding includes an elongated molding panel of generally concavo-convex curved section having an outwardly facing concave surface formed with a plurality of saber-shaped parallel transversely disposed ribs. Each rib has a proximal convex curved base edge, integrally molded to the concave surface, and a distal concave curved free edge positioned in juxtaposed conformity with an opposed convex curved surface of the pillar shell. The molding panel ribs cooperate with the shell for absorbing forces exerted thereon by an occupant striking the molding panel by initial deflection of the panel together with one for more of the ribs, and thereafter permanent deformation of the panel and one or more of the ribs if the force is sufficiently great.

3 Claims, 3 Drawing Sheets

ENERGY ABSORBING VEHICLE TRIM MOLDING

FIELD OF THE INVENTION

This invention relates to vehicle body moldings and, more particularly, to a plastic interior trim molding for absorbing energy to protect occupants of the vehicle passenger compartment in case of accident.

BACKGROUND OF THE INVENTION

It is known in the art to provide energy absorbing arrangements for the interior of vehicles to reduce injuries during an accident. U.S. Pat. No 5,040,335, issued Aug. 20, 1991 to Grimes, discloses an inner door panel assembly for a vehicle which is adapted to be connected to an outer door panel to form a space therebetween for a window and a window regulator. The panel assembly is an all plastic composite assembly including a plurality of integrally formed hollow boxes thereon faced in the direction of the interior space to absorb side impact energy directed against the side of the outer door panel.

U.S. Pat. No. 4,786,100 issued Nov. 22, 1988 to Kleemann et al., discloses a vehicle side door the inside of which is provided with an integrated molded part including cross webs constructed to be variably deformable under energy dissipation in case of impact of a body of a passenger seated in the vehicle.

SUMMARY OF THE INVENTION

The present invention provides an energy absorption molding in a vehicle body passenger compartment intended to absorb impact energy when an occupant impacts the molding during a collision. During a front or rear impact collision, the vehicle occupants may be thrust into the windshield, pillars, headliner, or dashboard.

It is a feature of the present invention to provide a vehicle interior trim molding having an elongated concavo-convex panel defining an outwardly facing concave surface integrally formed with a plurality of transversely extending parallel saber-shaped ribs extending normally from the panel concave surface. Each rib has a proximal convex curved base edge, integrally molded with the panel concave surface, and a distal concave curved free edge positioned in juxtaposed conformity with an opposed convex curved surface of a vehicle pillar inner sheet metal shell. The panel ribs cooperate with the shell for absorbing forces exerted thereon by a vehicle occupant striking the panel by initial deflection of the panel together with deflection of one or more of the ribs, and thereafter permanent deformation of the panel and one or more of the ribs if the force is sufficiently great.

These and other features and advantages of the invention will be more fully understood from the following detailed description of the invention taken together with the accompanying drawings.

DETAILED DESCRIPTION OF THE INVENTION

Figure 3:
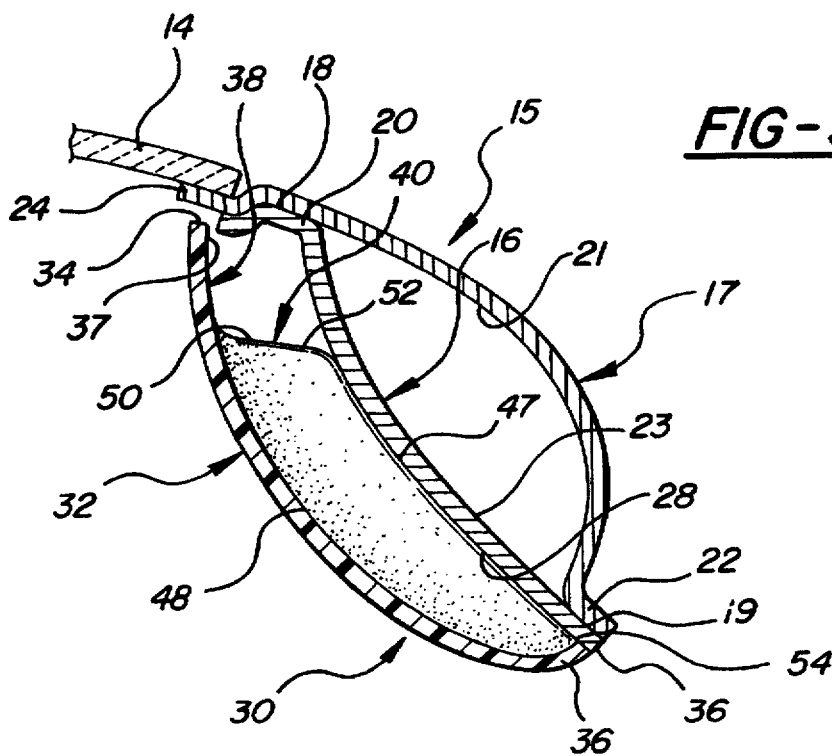
FIG. 3 is an enlarged fragmentary transverse cross sectional view of the A-pillar of FIG. 1 showing the molding attached to the inner side of the A-pillar.

Referring now to the drawings in detail, numeral 10 generally indicates a vehicle body showing a portion of an interior passenger compartment 12 including a front windshield 14 supported by front corner posts or A-pillars, the right hand one of which is shown at 15. As seen in FIG. 3, the A-pillar 15 is comprised of an inner concavo-convex curved sheet metal shell 16 and an outer concavo-convex curved sheet metal shell 17 which shells are connected at a leading joint 18 and a trailing joint 19, to form a closed hollow cross section. FIG. 3 shows the inner shell 16 formed with a forward flange portion 20 spot welded to an inner concave surface 21 of the outer shell 17. The outer shell 17 is formed with an aft flange portion 22 spot welded to an outer surface 23 of the inner shell 16. It will be noted that the outer shell is formed with an offset forward reveal flange 24 which supports a right hand border of the windshield 14.

Figure 1:
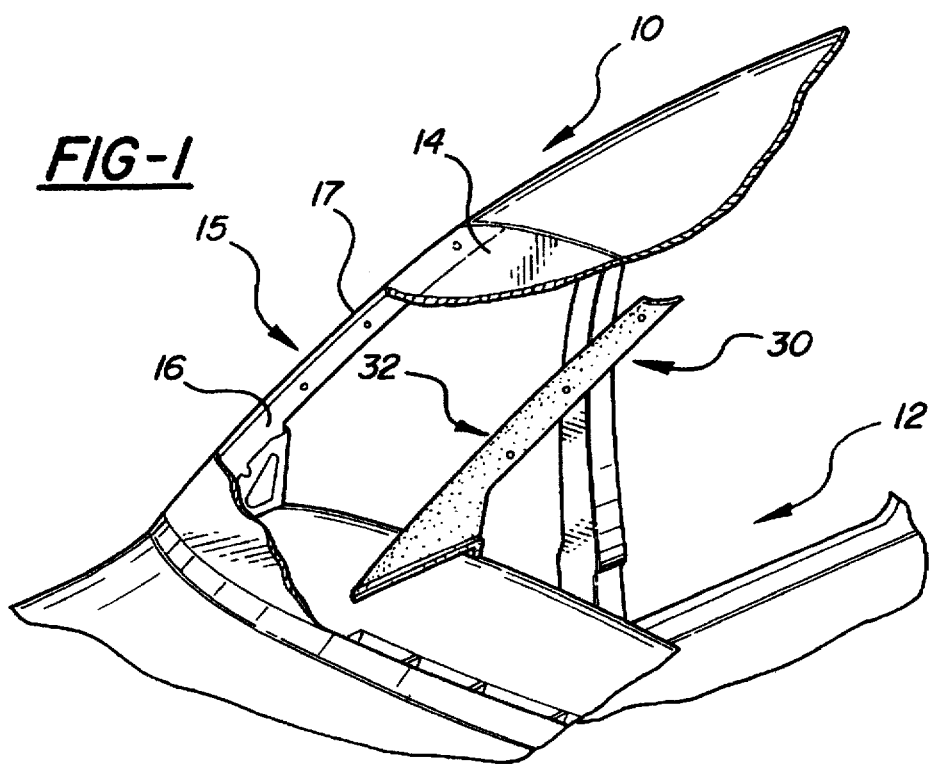
FIG. 1 is a fragmentary perspective view, with parts broken away, of a vehicle A-pillar interior molding of the present invention used for decorating and energy absorbing.
Figure 2:
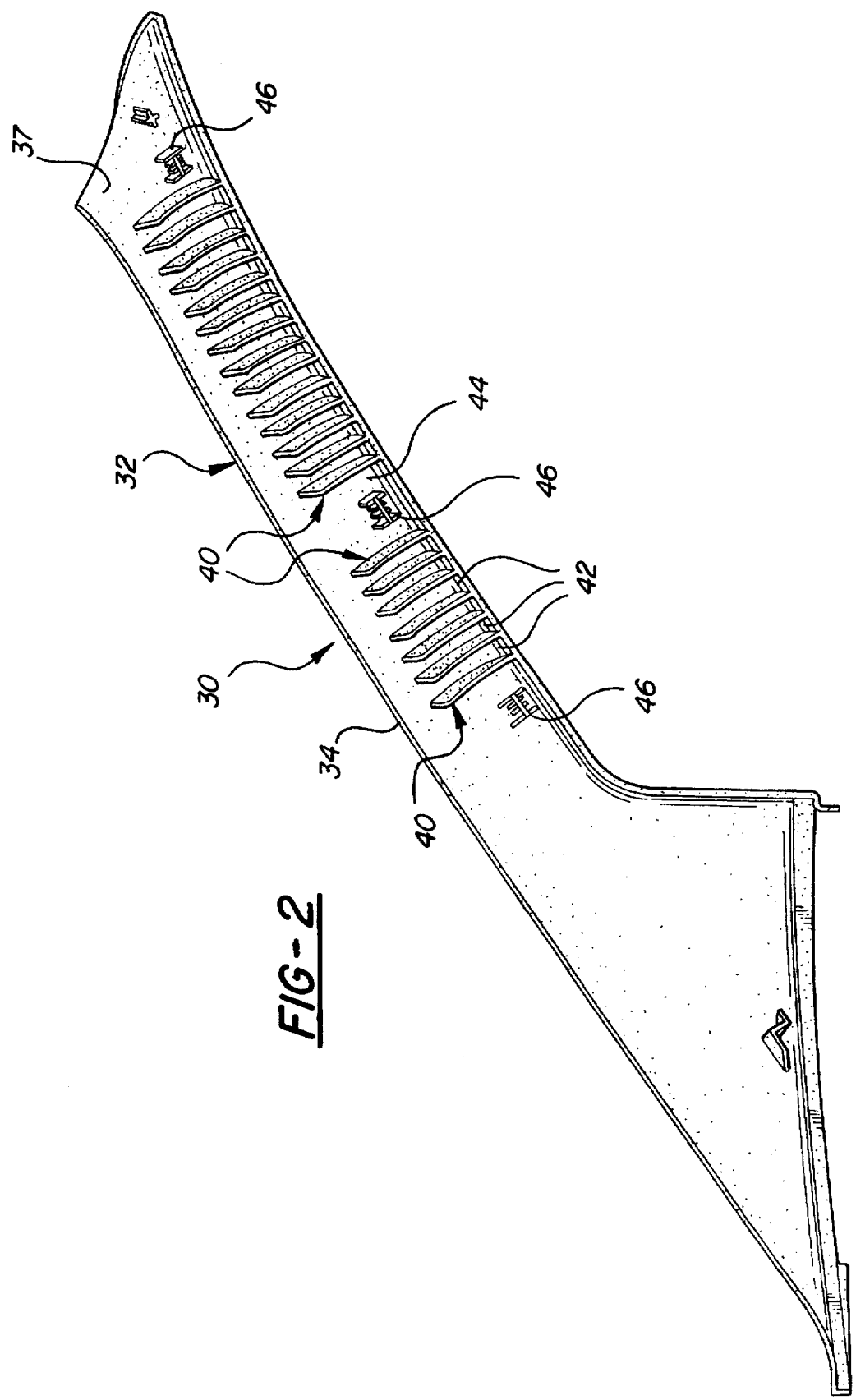
FIG. 2 is an enlarged detail plan view of the outboard side of the molding of FIG. 1.

With reference to FIG. 1, a right hand A-pillar 15 supports an interior trim molding of suitable elastomeric or plastic material such as synthetic resin, for example, indicated generally by numeral 30. As seen in FIGS. 2 and 3, the molding 30 is of one-piece construction including an elongated concavo-convex curved panel section 32 having a generally forward facing free front edge 34. The molding panel 32 terminates in a generally outboard extending rear curvedly bent boarder portion 35 terminating in a generally outboard facing rear free edge 36. It will be noted that the rear border portion rear free edge 36 is in flush abutting contact with a convex surface 28 of the A-pillar inner shell 16. The front free edge 34 is shown positioned in opposed spaced relation to the forward reveal flange 24 of the A-pillar outer shell 17.

The molding panel, as seen in FIG. 2, defines an inner concave surface 37, providing an inwardly bowed recess 38, integrally molded with a plurality of substantially identical parallel ribs 40 separated by uniform spaces 42. The series of ribs 40 are shown interrupted by a wide space 44 to accommodate an intermediate of one of three integral pillar attachment clips 46.

As best seen in FIG. 3, each of the ribs 40 is generally saber-shaped in plan, including an outboard or distal transverse concave free edge 47 which is positioned in matching juxtaposed relation to the A-pillar inwardly bowed convex surface 28. It will be observed that each rib 40 has a proximal convex base edge 48 integrally molded to the panel inner concave surface 37 of the trim panel 32 along its full transverse length. The base edge 48 is seen extending from radiused juncture 50 of rib forward edge 52 to the rib aft point 54, defined by the rear convergence juncture of the rib free edge 47 and the rib base edge 48. The rib forward edge 52 is spaced a predetermined dimension from the panel section free end 34. It will be noted that the rib forward edge 52 is sloped at an obtuse angle of the order of 165 degrees from the adjacent portion of the panel inner surface 37.

Figure 4A:
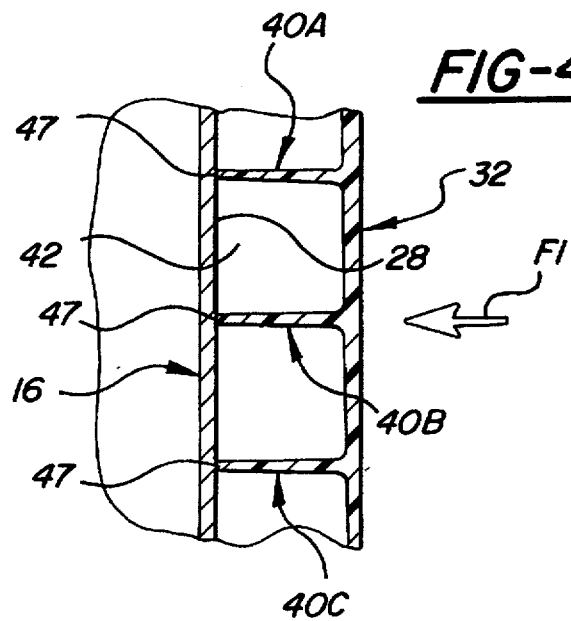
FIG. 4A is a fragmentary diagrammatic cross sectional view of a vehicle interior molding of the present invention in its vehicle body assembled state prior to being impacted by a force co-planar to a plane that includes one of the molding ribs.
Figure 4B:
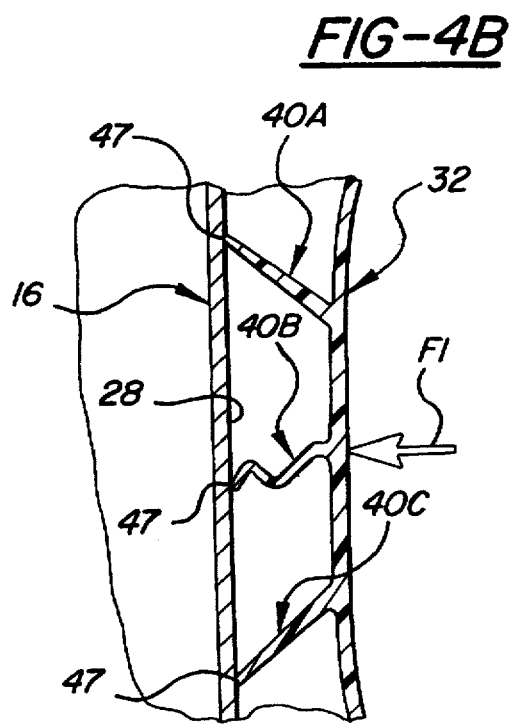
FIG. 4B is a view similar to FIG. 4A showing the FIG. 4A molding after being impacted by the FIG. 4A force.

With reference to FIG. 4A, it will be seen that the panel ribs 40 are adapted to cooperate with the body structure inner metal shell 16 to provide an energy absorbing composite arrangement for absorbing a force thereon by an occupant striking the molding panel 32. FIG. 4A shows a resultant force "F1" impacting the panel 32 substantially aligned in a plane defined by rib 40B. FIG. 4B shows the force "F1" causing the panel 32 to bow inwardly with resultant permanent deformation or breaking of the frangible rib 40B caused by the deflection of its free edge 47 with the inner metal shell 16. The adjacent ribs 40A and 40C have undergone permanent deformation upon being deflected in opposite diverging directions caused by the angular engagement of their free ends 47 with the metal shell 16.

Figure 5A:
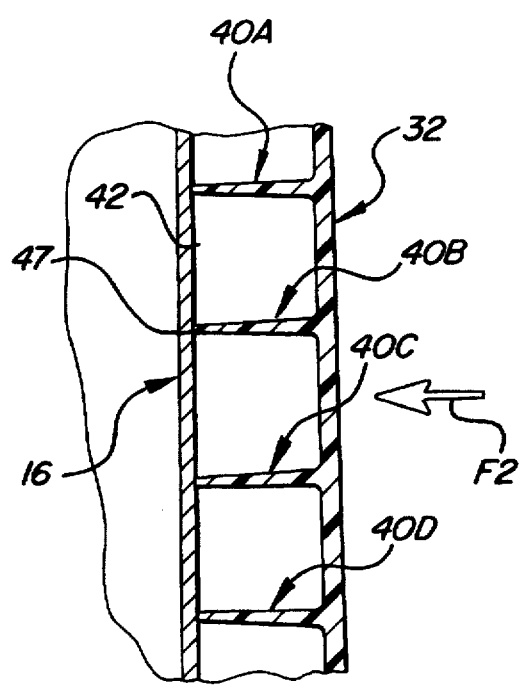
FIG. 5A is a view similar to FIG. 4A showing the molding of the present invention prior to being impacted by a force co-planar to a plane intermediate to and parallel with a pair of adjacent ribs.
Figure 5B:
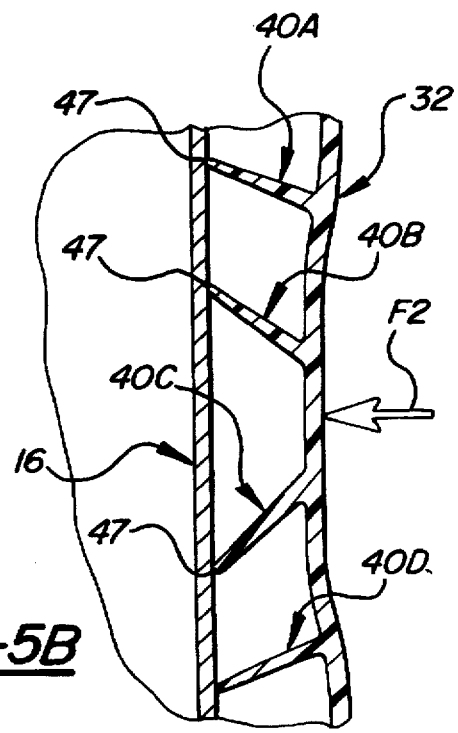
FIG. 5B is a view similar to FIG. 5A showing the FIG. 5A molding after being impacted by the FIG. 5A force.

Referring to FIG. 5A, a resultant force "F2" is shown impacting the panel 32 substantially intermediate an adjacent pair of ribs 40B and 40C. Assuming the force "F2" equals force "F1", FIG. 5B shows the force "F2" causing the panel 32 to bow inwardly substantially the same amount as the panel of FIG. 4B by virtue of the adjacent pair of ribs 40B and 40C diverging laterally outwardly to a permanently deformed angular position. At the same time the next adjacent pair of ribs 40A and 40D are shown having diverged laterally outwardly to a permanently deformed lesser angular position because of their greater lateral distance from the resultant force "F2".

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A trim molding in combination with a vehicle body support having forward and aft opposite body joining flanges, the trim molding comprising:

a generally elongated molding panel made of synthetic resin material having a generally concavo-convex curved sectional shape defining an inwardly facing concave surface extending generally over the length of the panel and an outer convex surface;

a plurality of saber-shaped parallel transversely disposed ribs equally spaced apart over said panel concave surface, each said rib having a proximal convex curved base edge integrally formed with said panel concave surface, and a distal concave curved free edge positioned in juxtaposed matching conformity with an opposed convex curved surface of the vehicle body support;

each said rib having a forward free edge spaced from a portion of the vehicle body support wherein each said rib convex base edge and said rib concave free edge converge to a rib aft juncture adjacent an aft end of the vehicle body supports whereby said ribs are adapted to cooperate with the vehicle body support providing an energy absorbing composite arrangement for absorbing forces exerted thereon by an occupant striking the molding panel, the energy absorption being provided by initial non-permanent deflection of the panel together with non-permanent deflection-of one or more of said ribs, and thereafter permanent deformation of the panel and one or more of the ribs if the force is sufficiently great.

2. The trim molding as set forth in claim 1 wherein each said rib forward free edge is spaced from the portion of the vehicle body support a dimension of the order of about one fourth of the overall rib dimension between each rib forward free edge and each rib aft juncture.

3. The trim molding as set forth in claim 1 wherein said molding panel has a forwardly facing free elongated edge and a rear curvedly bent border portion terminating in an outwardly facing aft free edge positioned in abutting flush contact with the vehicle body support.

* * * * *